Feb. 24, 1953     A. H. McKINNEY     2,629,261
MEASUREMENT OF LEVELS OF MATERIALS IN TANKS
Filed July 22, 1948     2 SHEETS—SHEET 1

INVENTOR.
ALFRED H. McKINNEY
BY
ATTORNEYS

Feb. 24, 1953  A. H. McKINNEY  2,629,261
MEASUREMENT OF LEVELS OF MATERIALS IN TANKS
Filed July 22, 1948  2 SHEETS—SHEET 2

INVENTOR.
ALFRED H. McKINNEY
BY
ATTORNEYS

Patented Feb. 24, 1953

2,629,261

UNITED STATES PATENT OFFICE 2,629,261

MEASUREMENT OF LEVELS OF MATERIALS IN TANKS

Alfred H. McKinney, Chester, Pa.

Application July 22, 1948, Serial No. 40,088

3 Claims. (Cl. 73—321)

This invention relates to an apparatus for measuring quantities of materials in tanks such materials including liquids and sludges and solids of a relatively fluent type. In particular the invention relates to the securing of accurate measurements, remote indication of measurements, and temperature compensation.

Tank gauges used heretofore have had various short comings particularly in respect to giving accurate indications at points remote from the tanks. Furthermore, they have generally required calculations to be made from the directly measured values of level to compensate for temperatures, tank shapes, distortions of the tank due to head of material etc.

One of the objects of the present invention is a provision of a tank gauge which may be calibrated so as to give direct readings irrespective of tank shapes and automatically corrected for tank distortions depending upon variation in liquid heads.

A further object of the invention is to provide means for compensating automatically for temperature changes so that direct readings may be obtained in terms of quantity of the material in the tank by weight or by volume reduced to a standard temperature.

Further objects of the invention relate to the provision of means for remote indication or recording of results or for control in accordance with quantities of materials in tanks.

As will appear hereafter, various features of the invention may be used to advantage independently of other features and the attainment of the foregoing objects as well as of other objects particularly relating the details of construction and operation will be apparent from the following description read in conjunction with the accompanying drawings, in which.

Figure 1:
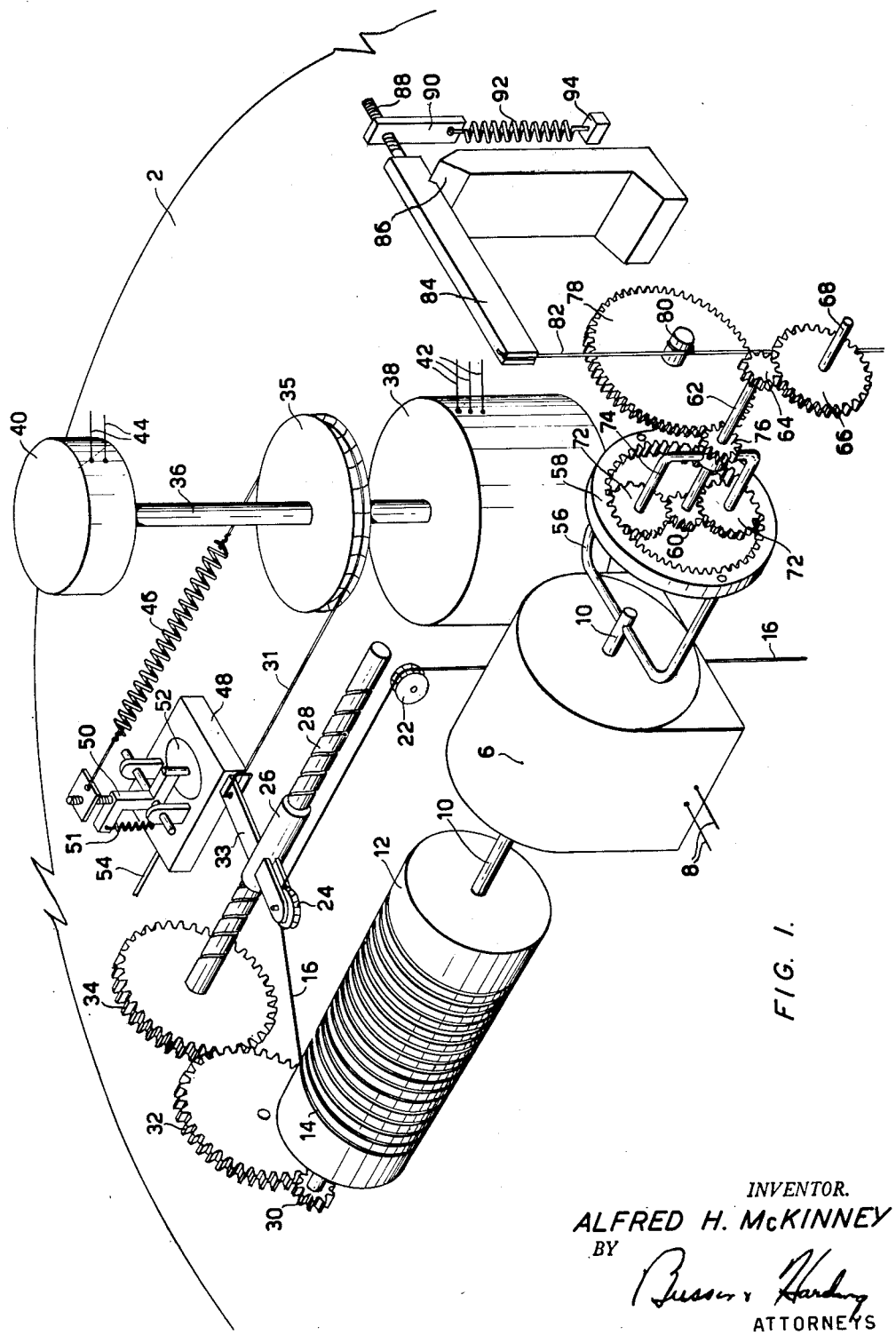
Figure 1 is a perspective view showing in diagrammatic form various mechanical parts which are carried at the top of a closed or open tank for the purpose of making measurements.
Figure 2:
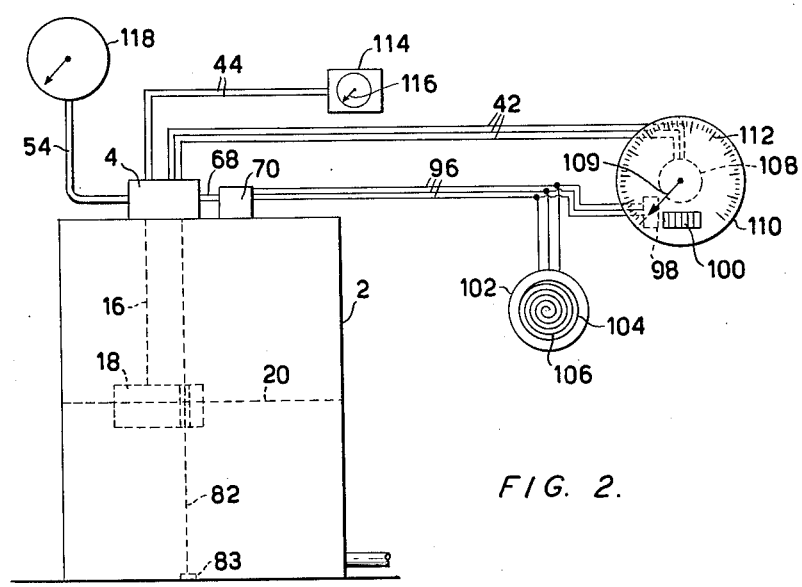
Figure 2 is a diagram illustrating the tank and associated parts as well as remote indicating instruments.

Referring first to Figures 1 and 2, there is illustrated a tank 2 which may be open or closed and which carries at its open end apparatus generally indicated at 4 and illustrated in detail in Figure 1. A motor 6 having power leads 8 is arranged to exert a fixed and definite torque on a shaft 10. This motor is normally in stalled condition and exerts a torque tending to turn the shaft 10 counterclockwise as viewed in Figure 1. Any ordinary A. C. or D. C. motor may used with the applied voltage sufficiently reduced, for example, by the use of a series resistor, so that the motor will not overheat even in its stalled condition and will nevertheless exert a substantially constant torque. Generally speaking the commercial voltage supplies will be sufficiently constant for the purpose of maintaining the torque constant; but if extreme accuracy is desired a voltage regulator may be included in the supply line. Instead of a motor a constant torque may be applied by means of a counterweight.

The shaft 10 carries a drum 12 which is provided with a helical groove 14 which will be more specifically referred to hereafter. This groove has a constant pitch. A wire 16 is secured at its end to the drum 12 and is wound in the groove 14. At its free end the wire 16 supports a float 18 partially submerged in the surface of liquid 20 in the tank 2, or in the surface of a free-flowing solid which will effectively buoy a float. As will be evident, it may float at the interface of two liquids of different density in this tank. The wire extends upwardly from the float about a pulley 22 having a fixed axis and thence about a pulley 24 to the groove in the drum. The pulley 24 is carried by a carriage 26 in the form of a nut surrounding a screw 28 which is geared to the drum shaft 10 through suitable gearing illustrated at 30, 32 and 34. The purpose of the pulley 24 is to guide the wire 16 to proper position to enter the groove, and, accordingly, the screw 28 is provided with a constant pitch thread which, taking into account the gearing just mentioned, will serve to traverse the wire in the direction of the axes of the screw 28 and the shaft 10 to maintain the lead of the wire always directly toward the portion of the groove which it approaches. To simplify the showing, bearings and other conventional parts are omitted from Figure 1. An arm 33 carried by the carriage 26 anchors one end of a wire 31 which passes about and is secured to a pulley 35 carried by an upright shaft 36 of a Selsyn transmitter 38. The word "Selsyn"

is the trade name of a well-known electrical control system manufactured by the General Electric Company. Where the word "Selsyn" is used in this specification it will be understood that either this General Electric system or any other suitable control system may be employed. The shaft 36 is also connected to an electrical transmitter which may take the form of a rheostat or potentiometer 40. The leads from the Selsyn transmitter are indicated at 42 while those from the device 40 are illustrated at 44. These will be referred to hereafter. A spring 46 connected to the wire 31 is in turn connected to a lever 50 and exerts a pull on that lever in opposition to a spring 51. This lever 50 acts upon the diaphragm 52 of a conventional pneumatic transmitter 48 which need not be discussed in detail. This transmitter is of the type which provides in an outlet connection 54 a pressure which is proportional to, or otherwise directly related to, the force exerted on the lever 50 by the spring 46. As will be evident the pressure in the connection 54 will be directly related to the position of the carriage 26.

The shaft 10 of the motor 6 is provided with a cage arrangement 56 which supports an annular gear 58 of a planetary system. The sun gear 60 of the system is carried by a shaft 62 which, through gearing 64 and 66, drives an output shaft 68 of a Selsyn transmitter 70 (Figure 2). Planet gears 72 are carried by arms 74 providing a cage secured to the hub of a pinion 76 which is journalled on the shaft 62 and meshes with a gear 78 having a shaft 80. Wound about the shaft 80 so that its movements will drive the shaft is a wire 82 which passes downwardly inside the tank and is anchored at the bottom of the tank at 83. This wire may serve as a guide for vertical movements of the float 18 and for this purpose may pass through a suitable hole in the float. The upper end of the wire 82 is connected to a lever arm 84 fulcrumed on a knife edge 86 and provided with a threaded extension 88 on which is arranged for adjustment a nut 90 connected through a spring 92 to a fixed anchorage 94 on the top of the tank.

The operation of the parts so far described is such as to provide transmission of liquid quantities as may now be indicated.

Figure 3:
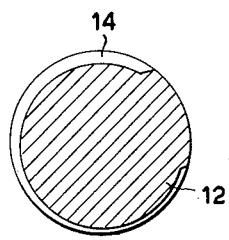
Figure 3 is a radial section through a drum illustrated in Figure 1.

The drum 12 illustrated in Figure 1 is cylindrical. However, as illustrated in the sectional view constituting Figure 3, the groove 14 in the drum may not be of constant depth. This groove is contoured so that for any given movement of the wire 16 the angular rotation of the drum is such as to correspond to a definite quantity of liquid in the tank in terms of either volume or weight assuming the temperature to be constant. If a cylindrical tank were used having such rigidity that it would not suffer deformation to an appreciable degree due to variations of liquid head, the drum 12 could be cylindrical and the groove 14 of constant depth. However, if the tank is of a type which is subject to deformation with different heads of liquid or is approximately but not accurately cylindrical interiorly the groove 14 is suitably contoured or varied in depth so that, still assuming temperature constant, the rotation of the drum 12 corresponding to different positions of the float 18 will constantly be directly proportional to the volume or weight of liquid. The contouring of the groove here involved may be determined either by calculation or empirically. The groove, for example, may be cut or ground into the surface of the drum through the use of a V-shaped cutter or grinder, the distance of which from the drum axis may be varied in desired fashion during the groove-forming operation.

Figure 4:
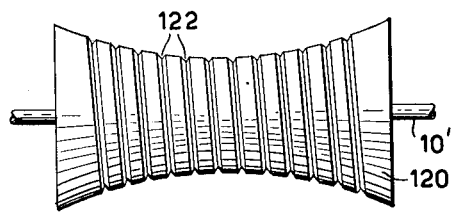
Figure 4 is an elevation illustrating an alternative form of drum contoured to correspond with a particular tank shape.

In more extreme cases it is desirable to shape the drum as, for example, when spherical or other tanks are involved departing very considerably from cylindrical or prismatic shape. In Figure 4 the drum is illustrated at 120 provided with a groove 122 which may be of constant depth and which is desirably of constant pitch. This drum is carried by a shaft 10' corresponding to the shaft 10.

The float used when a single liquid is being measured may vary considerably in form but for sensitivity should, of course, have a considerable horizontal cross sectional area so as to impose as large a torque as possible at the shaft 10 for a given vertical movement relative to the surface of the liquid. It may be here noted that, while the torque exerted by the motor 6 at the shaft 10 is constant, the tension applied to the wire or cable 16 will not be constant but will depend on the effective radius where the wire reaches the drum 12. The slight differences of position of the float relative to the liquid surface resulting from this may be taken into account in contouring the drum groove; but if the horizontal cross-section of the float is large and the torque applied by the motor 6 is small, the effect just mentioned will usually be negligibly small. It is possible by the use of the present apparatus to detect reliably a change of liquid level which is of only a very small fraction of an inch.

In case it is desired to measure the interface between two liquids of different densities, the float would of course be such as to sink in the lighter liquid and float in the heavier when the motor torque is applied thereto.

Figure 5:
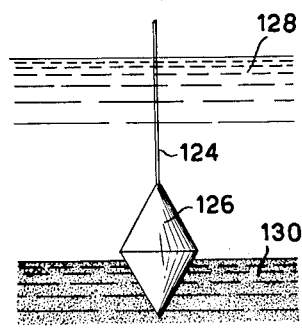
Figure 5 is a fragmentary sectional view illustrating the application of the invention to the measurement of a sludge in the lower portion of a mass of liquid.

The invention may be applied to the measurement of solids which have settled to the bottom of a liquid, for example, by the use of a float arrangement such as illustrated in Figure 5 in which the wire 124 corresponding to 16 supports a double conical float 126 adapted to sink in the supernatant liquid 128 but to be buoyed up by the solid material containing liquid and forming a fluent mass at 130. It will be evident that an inversion of the arrangement of Figure 5 could detect the bottom surface of a solid mass of granular material floating at the top of a body of liquid.

From the foregoing it will be evident that the output of the shaft 10 in the form of angular rotation and the output of the shaft 36 in the form of angular rotation and of the pneumatic transmitter 48 in the way of pressure may be made proportional to or, at any rate, to provide a definite function of, a volume in a tank at a particular temperature. Before considering the matter of receivers, there will be described the provision for temperature compensation. Temperature compensation involves a number of factors. First, there is to be considered the coefficient of volumetric expansion of the liquid (possibly in combination with solid material) in the tank. Secondly, there is involved the coefficient of linear expansion of the material (or materials) of the tank itself. Third, there must be considered the expansion of the supporting wire 16. To be correlated with these is the coefficient of linear expansion of the compensating wire 82. Furthermore, if the spring 92 is not a stiff spring its spring rate must be taken into account.

It will not be necessary in this specification to enter into a complete discussion of the mathematical proof that these various coefficients may be correlated with each other in such fashion as to cause the readings delivered by the output shaft 68 to be automatically corrected for variations of temperature so as to be substantially independent of temperature changes. This end may be attained to theoretically complete accuracy to the extent that the linear deformations with respect to temperature are involved. Second degree corrections are usually completely negligible, but even if they do exist, a mean linear type of correction will practically always give a sufficient approximation to the compensation desired.

Briefly stated the compensation is effected by so choosing the material of the compensating wire 82 and the various gear ratios involved that if a temperature change occurs without any change in quantity of the liquid the shaft 68 will remain stationary, the compensation occurring due to the fact that a rotation, which would be imparted to the sun wheel 60 by rotation of the shaft 10, will be compensated for by an opposite rotation applied to the sun wheel through the planet gears 72. It may be noted that to effect this compensation the gear 76 might possibly in some instances rotate in one direction with increase of temperature and in other instances in the opposite direction depending upon the materials involved. The wire 82 may have a lower coefficient of expansion than the tank; even a substantially zero coefficient if made of Invar or similar metal.

At this point, it may be noted that the wires 16 and 82 and the float 18 should be formed of materials which will not be corroded by the materials in the tank, and they may be properly shielded by baffles against the splashing of entering liquid if that liquid happens to be of a nature which due to evaporation or some chemical change would be likely to form a deposit on the wires. The wire 82 may have a greater or less coefficient of expansion than the wire 16, if other factors, such as gear ratios used properly, correspond to these coefficients.

It may be noted that the temperature of compensation is particularly realistic in not assuming that the wire 16 has the same temperature as the liquid 20 and in not assuming that the wire 82 is of constant temperature throughout. The portion of the wire 82 which is submerged in the liquid will have the temperature of the liquid while the portion which is above the liquid will have the temperature of the wire 16. The possible differences in temperatures here involved may be taken into account in the calculations which relate the various parts of the apparatus so that temperature compensation is achieved not only for some particular liquid content of the tank but through a large range of variation of these contents.

To summarize the outputs from the apparatus, it is to be noted that in the case of the apparatus described, the outputs secured through the medium of the nut 26 and/or the shaft 36 are not corrected for temperature but are corrected for tank shape and possible distortion of the tank due to change of head of the materials therein. On the other hand the output from the shaft 68 is not only compensated for these factors but for temperature as well, and this shaft constitutes the output which may be regarded as highly accurate. However, in many cases the less accurate outputs through the nut 26 and/or the shaft 36 are also desirable.

Figure 2 illustrates the various types of instruments which may be used to give records or indications of the tank contents. The most accurate indication is given through the shaft 68 and Selsyn transmitter 70, the output lines 96 from which extend to a Selsyn receiver 98 which drives a counter 100 which may, by suitable gearing, be caused to register in any desired units. This register will give to the accuracy attainable by the apparatus the quantity of material in the tank in terms of weight, or, equivalently, the volume at some standard temperature.

A useful type of indicator is one which will give at a glance an indication of whether the tank is being filled or emptied. Such an indicator is illustrated as comprising a Selsyn motor 102 connected to the lines 96 and driving a disc 104 provided with a spiral line on its face indicated at 106. If this spiral is viewed directly or through a radially extending slot in a housing, the direction in which the lines of the spiral seem to move, either inwardly or outwardly, will serve at a glance to indicate whether the tank is being filled or emptied. It will be evident that if to the shaft of a motor such as 102 there is connected a suitable tachometer the rate of flow into or out of the tank may be directly indicated.

In many instances it is desirable to have an accurate register such as 100 combined with a large readily visible indicator of approximate contents and this is afforded by providing a dial 110 graduated at 112 and over which a pointer 109 moves driven by a Selsyn receiver 108 connected to the lines 42. The scale range from empty to full may occupy, for example, 300° of the circumference of the dial 110 and conveniently the accurate register 100 may be visible through an opening in the face of this dial.

An indicator having a function similar to that last described may be provided as indicated at 114 in the form of a conventional automatic potentiometer indicating through the medium of a pointer 116 cooperating with a dial, this potentiometer being connected to the lines 44. A similarly functioning receiver 118 may be connected to the tube 54, this device 118 being of pneumatic type in the form of a pressure gauge which may be graduated in terms of quantity of liquid or other material in the tank. Such pneumatic devices are sometimes to be preferred where the liquids involved are highly inflammable, and where consequently, safety precautions may preclude the use of electrical current.

It will be evident that the indicators just described are merely illustrative of a very large variety which may be used for local or remote indication. It will also be evident that many of these indicators may take the form of recorders having time-driven charts so as to give a permanent history as well as direct indication of the contents of the tank.

It will also be apparent from the foregoing that the entire apparatus described need not necessarily be used in every installation; if only accurate indications are desired, only the output from a shaft such as 68 need be used. On the other hand, if temperature compensation is not required, output taken directly from the shaft 10 may drive a counter either mechanically or through electrical or pneumatic connections. Furthermore, if small variations of tank contents are not to be indicated, there need be no output from the shaft 10 but outputs may be secured from a shaft such as 36 in the fashions described.

What I claim and desire to protect by Letters Patent is:

1. Apparatus for measuring the level of fluent material in a tank comprising a float, flexible supporting means for said float, a drum about which said flexible supporting means may be wound, means applying a torque to said drum urging it to wind up said flexible supporting means to maintain the float in a position of equilibrium in which it is partially submerged in a surface of said fluent material and partially supported by the buoyancy of said material, and rotatable means movable in conformity with the position of said drum for indicating the quantity of material in the tank, the last mentioned means including devices for temperature correction of its indications, said devices including a member extending downwardly through said tank and having a predetermined response to temperature changes, and a planetary gear mechanism responsive to means actuated by movement of said member in response to temperature changes of the fluent material in the tank, said planetary gear mechanism acting to position the rotatably movable means indicating the quantity of material in the tank to provide said temperature correction of its indications.

2. Apparatus for measuring the level of a fluent material in a tank comprising a float, flexible supporting means for said float, a drum about which said flexible supporting means may be wound, means applying a torque to said drum urging it to wind up said flexible supporting means to maintain the float in a position of equilibrium in which it is partially submerged in a surface of said fluent material and partially supported by the buoyancy of said material, and rotatable means movable in conformity with the position of said drum for indicating the quantity of material in the tank, the last mentioned means including devices for temperature correction of its indications, said devices including a flexible member extending downwardly through said tank and having a predetermined response to temperature changes, means imposing a substantially constant tension on said flexible member, and a planetary gear mechanism responsive to means actuated by movement of said member in response to temperature changes of the fluent material in the tank, said planetary gear mechanism acting to position the rotatably movable means indicating the quantity of material in the tank to provide said temperature correction of its indications.

3. Apparatus for measuring the level of a fluent material in a tank comprising a float, flexible supporting means for said float, a drum about which said flexible supporting means may be variably wound, said drum having a groove for the reception of said flexible supporting means which groove is contoured with variable spacing from the drum axis to correspond to the tank shape, means applying a predetermined substantially constant torque to said drum urging it to wind up said flexible supporting means to maintain the float in a position of equilibrium in which it is partially submerged in a surface of said fluent material and partially supported by the buoyancy of said material, and rotatable means movable in conformity with the position of said drum for indicating the quantity of material in the tank, the last mentioned means including devices for temperature correction of its indications, said devices including a member extending downwardly through said tank and having a predetermined response to temperature changes, and a planetary gear mechanism responsive to means actuated by movement of said member in response to temperature changes, and a planetary gear mechanism responsive to means actuated by movement of said member in response to temperature changes of the fluent material in the tank, said planetary gear mechanism acting to position the rotatably movable means indicating the quantity of material in the tank to provide said temperature correction of its indications.

ALFRED H. McKINNEY.

REFERENCES CITED

The following references are of record in the file of this patent:

UNITED STATES PATENTS

| Number | Name | Date |
|---|---|---|
| 1,188,793 | Kuludjian | June 27, 1916 |
| 1,483,131 | Tausz et al. | Feb. 12, 1924 |
| 1,557,568 | Dilley | Oct. 20, 1925 |
| 1,972,146 | Johnson | Sept. 4, 1934 |
| 2,081,950 | Nesbitt | June 1, 1937 |
| 2,216,035 | Lang | Sept. 24, 1940 |
| 2,216,036 | Lang | Sept. 24, 1940 |
| 2,379,328 | Weingart | June 26, 1945 |

FOREIGN PATENTS

| Number | Country | Date |
|---|---|---|
| 505,957 | France | Nov. 12, 1919 |
| 89,436 | Sweden | June 8, 1937 |